Patented Jan. 26, 1932

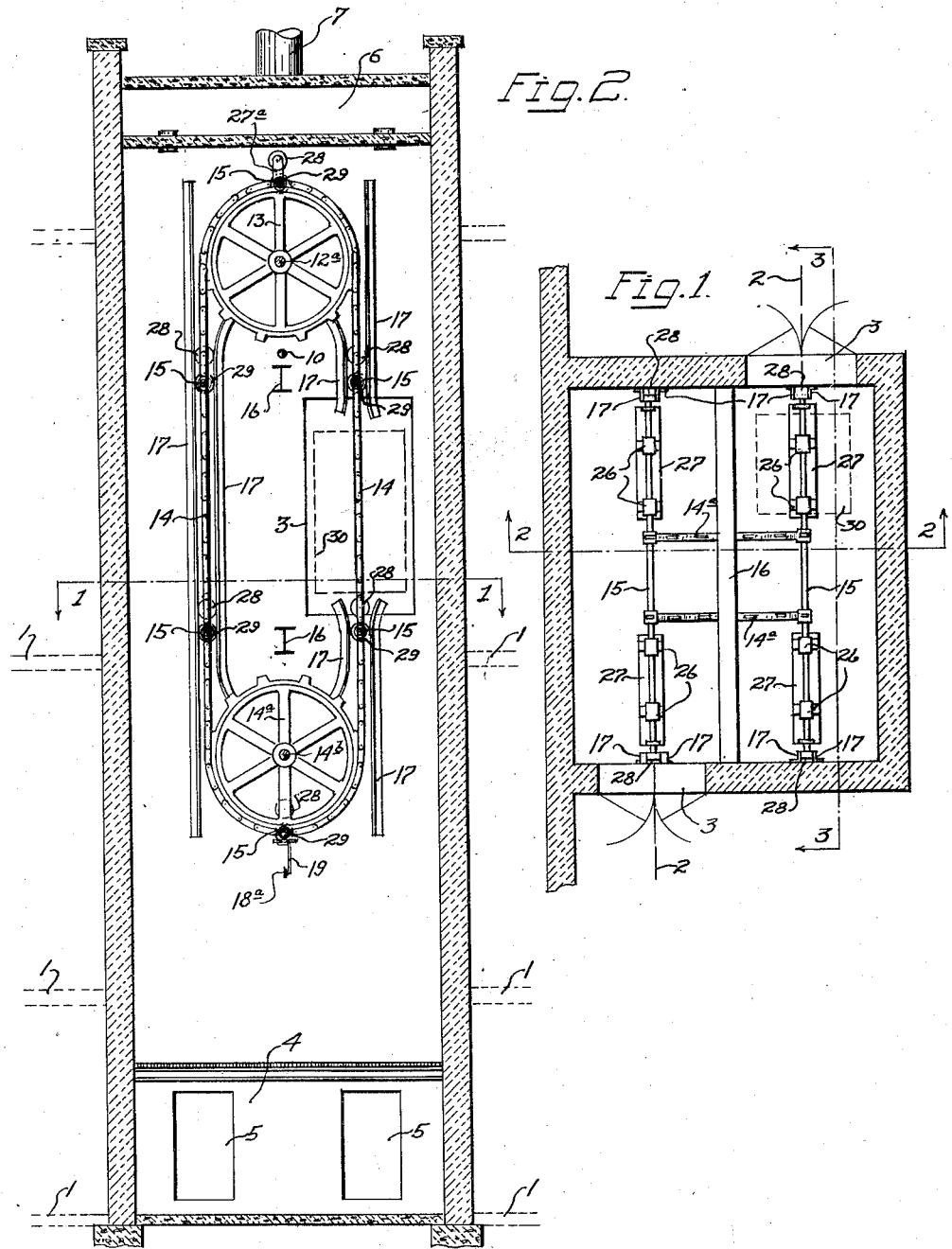

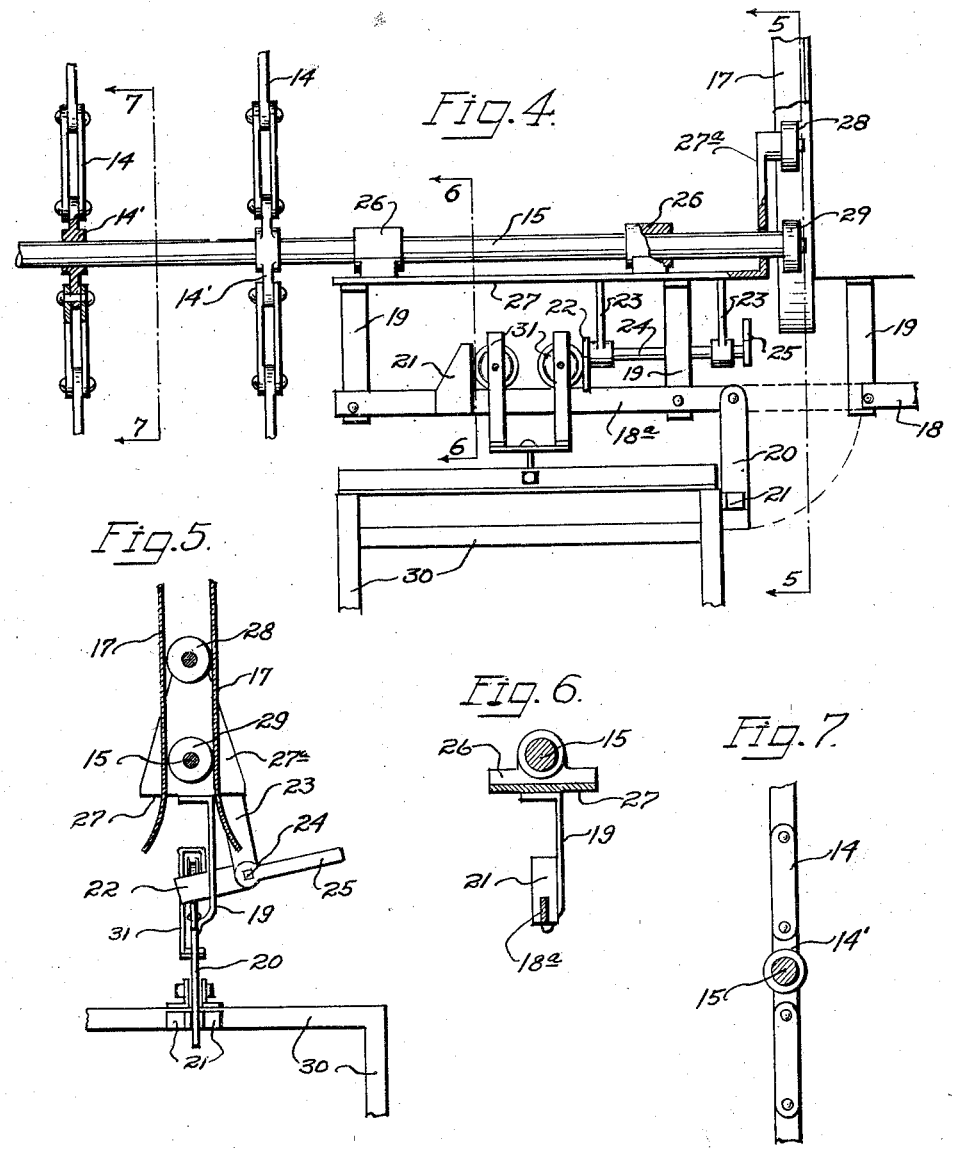

1,842,431

UNITED STATES PATENT OFFICE

CHARLES STADLER, OF WEST NEW YORK, NEW JERSEY

SMOKE HOUSE

Application filed December 15, 1928. Serial No. 326,286.

This invention relates to smoke houses and more particularly to apparatus that may be used as a smoke house for curing, treating, smoking, baking or impregnating substances. In the present disclosure the invention is shown and described as applied to the smoking of sausages although it is obviously capable of various other applications.

One object is to provide a smoke house wherein economy of floor space occupied is effected in relation to the volume of finished product turned out. A further object is to provide a smoke house wherein the product is uniformly smoked or treated automatically, this result being accomplished while but one fire is used thus effecting economy in the use of fuel.

A still further object is to provide a smoke house of small size relative to capacity and one in which the employment of manual labor is reduced to the minimum.

With the foregoing and other objects in view the invention consists in the combination and arrangement of parts to be hereinafter fully described, pointed out in the claims and illustrated in the accompanying drawings which form a part of this application for patent and in which—

Fig. 1 is a cross sectonal view of a smoke house embodying the present invention and it is taken on line 1—1 of Fig. 2.

Fig. 2 is a central vertical sectional view of the smoke house taken on line 2—2 of Fig. 1.

Fig. 4 is an enlarged fragmentary sectional view clearly illustrating the mechanism for securing a sausage cage to the rotary mechanism of the smoke house.

Fig. 5 is an end view of Fig. 4 taken on line 5—5 of that figure.

Figure 3:
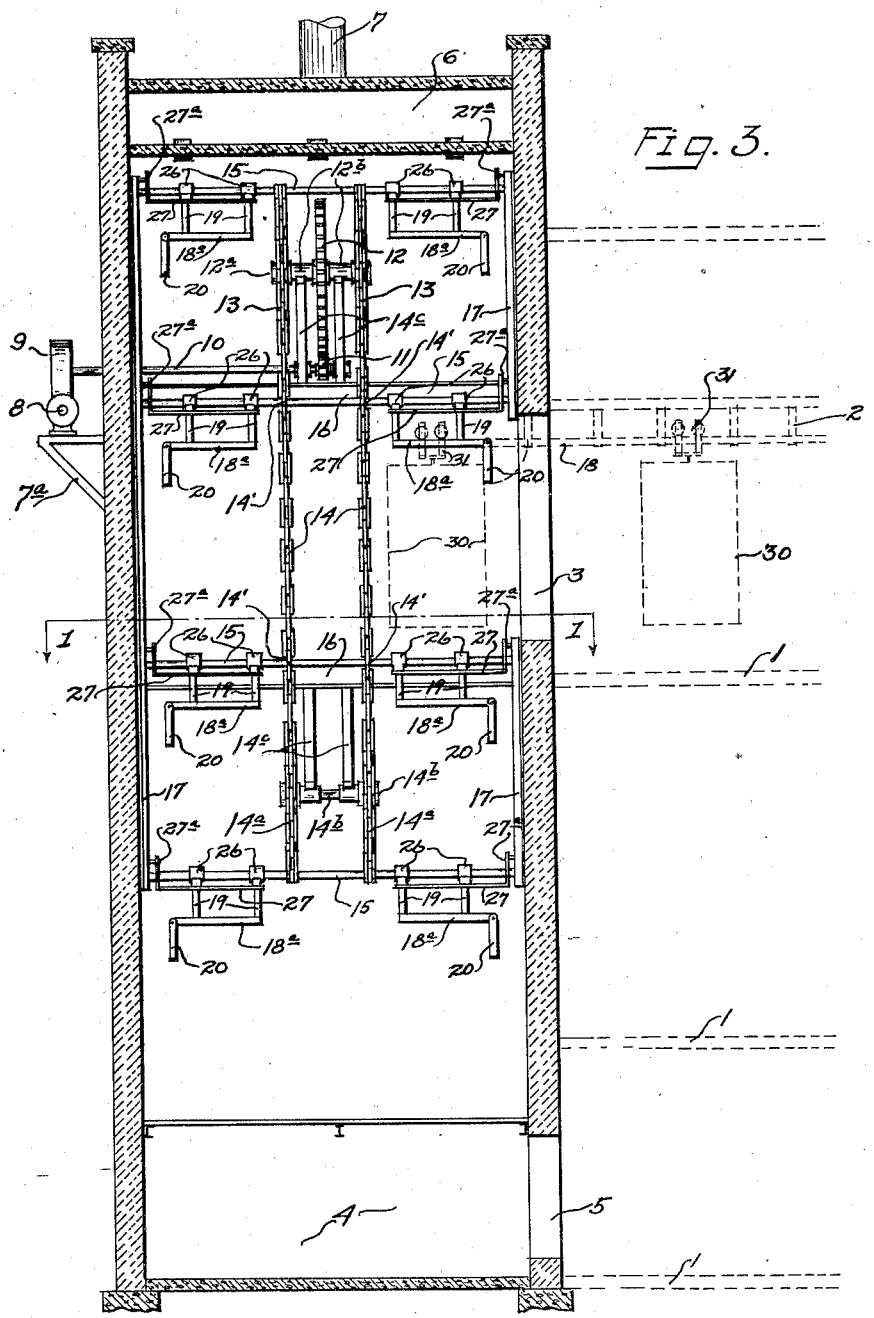
Fig. 3 is a vertical sectional view taken on line 3—3 of Fig. 1.

Figs. 6 and 7 are detail views taken respectively on lines 6—6 and 7—7 of Fig. 4.

Like reference characters denote corresponding parts throughout the several views.

In the construction of smoke houses it is essential that means be provided whereby the substances treated shall be uniformly smoked thus insuring a quality product. High volume of output or product relative to the size of the smoke house is a further requisite. The present invention provides a house that will accommodate a considerable number of sausage cages or ham and bacon trees at one time and with the use of but one fire, novel means for receiving the cages or trees, for propelling them inside the smoke house and for discharging them with the finished product are provided.

The smoke house is a part or division of the sausage factory comprising the several floors 1 and including in its tracking system the monorail 2 for the sausage cages. The present smoke house is an elongated quadrilateral structure, preferably, of such height as will conveniently take care of the product of the factory, the greater the height of the smoke house the greater number of sausage cages or trees that can be accommodated at the same time. The smoke house is provided with receiving and delivery openings or doors 3 and comprises the conventional fire pit 4 fed through the opening 5, the condensation chamber 6 and the vent 7.

Operatively supported in suitable bearings upon the shelf support 7a secured to one wall of the smoke house and exterior thereof is the motor shaft 8, driven from the motor (not shown), in mesh with the worm wheel 9 that is fast upon and drives the transmission shaft 10 that has fast thereupon, within the smoke house, the drive pinion 11 in mesh with the gear wheel 12 fast upon the shaft 12a rotative in a bearing 12b, said shaft 12a having fast thereupon the sprocket wheels 13, 13 connected by sprocket chains 14, 14 to a second set of sprocket wheels 14a connected by shaft 14b which shaft, like the shaft 12a, is operatively supported by uprights 14c carried by the supports 16.

Each sprocket chain 14 comprises a plurality of carriage links 14', the links 14' of one chain 14 being diametrically opposite the links 14' of the other chain 14 and each pair of links 14' engages and supports a transversely extending arm 15, said arms extending from side to side of the smoke house and each being provided at its ends with rollers 29 that ride in the vertically disposed guides 17 secured to the walls of the smoke house. Loosely or hingedly secured to each arm 15 are pairs of hinges 26, each pair carrying a hanger 27, one of the ends 27a thereof being bent upwardly and perforated to permit passage therethrough of one end of the supporting arm 15, the extremity of said portion 27a being bent outwardly and provided with a roller 28 that runs in one of the said guides 17.

Depending from each hanger 27 are the rigid parallel links 19 that at their lower ends are connected by and support a rail 18a to one end of which a link 20 is hinged that is capable of movement back and forth from the position shown in full lines to dotted position, in Fig. 4, whereby the rail 18a may be releasably connected to the monorail 18 forming part of the factory tracking. Depending from the hanger 27 are the bearings 23 for the rotary shaft 24 provided at one end with an operating handle 25 and at the opposite end with an offset shoe 22.

A sausage cage 30 is supported by the carriage 31 adapted to run along the rail 18a and over the monorail 18 when said members are connected by the said link 20. The said cage 30 is provided, as is the rail 18a, with a stop block 21, the block 21 of cage 30 serving in one position of the link 20 as a stop for the cage 30 to prevent turning or swinging movement of the same and the block 21 of rail 18a serving as a stop for the carriage 31 which may be lodged upon rail 18a between said block and the offset shoe 22 in one position of the same, illustrated in Fig. 4.

Each arm 15, of which there are a plurality, will accommodate one carriage 31 with its sausage cage upon each side of the sprocket wheels 13, the path of movement of the chains 14 being such that each chain, in its travel, passes before one or the other of the openings or doors 3 thus permitting the receipt or delivery of the cages 30 from or to the monorail 18. The construction of the shoe 22 is such that it can be moved back and forth into and out of the path of movement of the said carriage to permit or block passage thereof as may be desired.

As the several cages 30 are loaded in the factory they are run upon the several rails 18a and all are then slowly moved or carried by said rails from top to bottom of the smoke house as the conveyer mechanism therewithin is operated as described. It is obvious that uniform smoking of the contents of the cages will thereby be effected. The interlocking feature of the several arms 15 with the hanger portions 27a insures stability in operation of the movable parts, the rollers 28, 29 riding into and out of the open ends of the guides 17.

What is claimed is:—

1. In smoke house apparatus, an elongated smoke chamber, a firebox therebeneath, a conveyer within said smoke chamber comprising a plurality of arms extending transversely thereof, a fixed monorail outside said chamber contiguous to openings therein, rails arranged upon the ends of said arms adapted to align consecutively with said fixed monorail, hinged links carried by said second mentioned rails, carriages mounted upon said second mentioned rails for movement thereover, stops for said carriages carried by said second mentioned rails, cages carried by said carriages, and stops carried by said cages for cooperation with said hinged links.

2. In smoke house apparatus, an elongated smoke chamber, a firebox therebneneath, a conveyer within said smoke chamber comprising a plurality of arms extending transversely thereof, a fixed monorail outside said chamber contiguous to openings therein, guides receiving the ends of said arms, hangers hinged to said arms and having upturned ends receiving the ends of said arms, the free upturned ends of said hangers being received in said guides, rails carried by said hangers and adapted to align consecutively with said fixed monorail, hinged links carried by said second mentioned rails, carriages mounted upon said second mentioned rails, stops for said carriages in one position thereof carried by said second mentioned rails, cages carried by said carriages, and stops carried by said cages for cooperation with said links.

3. In smoke house apparatus, an elongated smoke chamber, a firebox therebeneath, power driven sprocket chains spaced apart within said chamber, arms extending transversely of said chamber and carried by said chains, guides in said chamber receiving the ends of said arms, hangers at the ends of said arms having upturned ends receiving said arms and terminating in said guides, a fixed monorail outside said chamber contiguous to openings therein, rails carried by said hangers for alignment consecutively with said fixed monorail as said arms move, carriages releasably arranged upon said second mentioned rails, links carried by said second mentioned rails, cages carried by said carriages, manually operable offset shoes carried by said hangers for stop-engagement with said carriages, and stops carried by said rails and by said cages.

In testimony that I claim the foregoing as my own I have hereto affixed my signature.

CHARLES STADLER.